April 11, 1950 H. C. PROUSE 2,503,411
TRAILER MOUNTED ENGINE COOLING SYSTEM
Filed Dec. 20, 1948
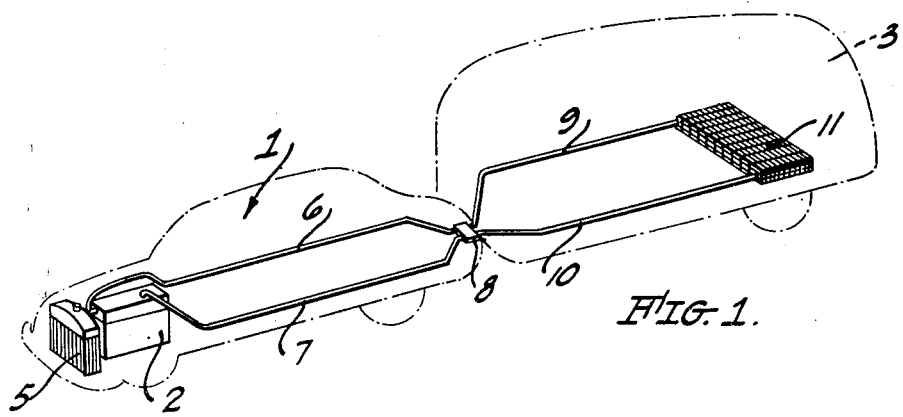
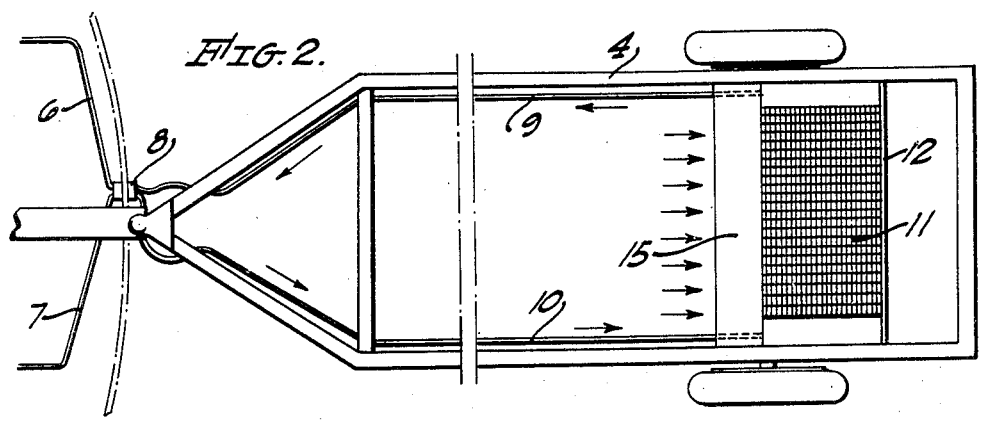
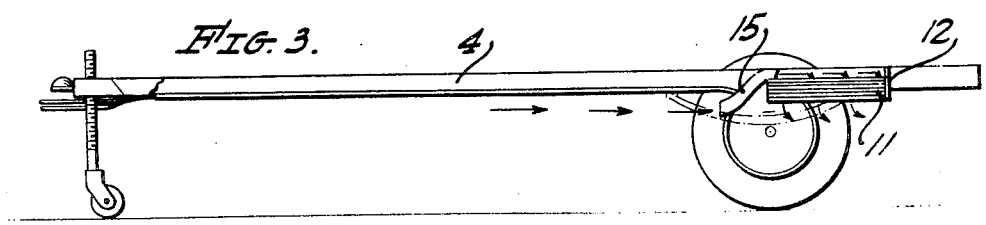
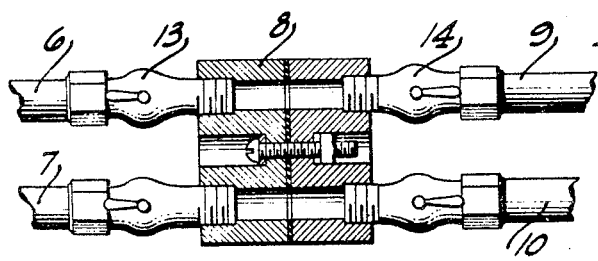
INVENTOR.
HARRY C. PROUSE,
BY
ATTORNEY.

Patented Apr. 11, 1950

2,503,411

UNITED STATES PATENT OFFICE 2,503,411

TRAILER MOUNTED ENGINE COOLING SYSTEM

Harry C. Prouse, Long Beach, Calif.

Application December 20, 1948, Serial No. 66,233

4 Claims. (Cl. 123—170)

This invention relates to a trailer mounted auxiliary engine cooling system. The engines of automobiles which tow trailers frequently overheat due to the additional load of the trailer and the fact that the cooling system of the engine is designed for the load of the vehicle only.

An object of my invention is to provide a novel trailer mounted auxiliary engine cooling system which is mounted on the trailer and is used only when the trailer it attached to the vehicle.

Another object of my invention is to provide a novel auxiliary engine cooling system which can be easily and quickly coupled to a normal engine cooling system, and provides additional water capacity and also an enlarged cooling surface.

A feature of my invention is to provide a novel trailer mounted engine cooling system which is mounted on the frame of the trailer so that it is not unsightly, and further that it will not be damaged in normal operation of the vehicle and trailer.

Another feature of my invention is to provide an auxiliary engine cooling system for the engine of a vehicle in which the water is circulated by the usual water pump of the engine.

Other objects, advantages and features of invention may appear from the accompanying drawing, the subjoined detailed description and the appended claims.

In the drawing:

Figure 1 is a diagrammatic perspective view of my auxiliary engine cooling system mounted on a trailer.

Figure 2 is a top plan view of the trailer frame with my cooling system mounted thereon.

Figure 3 is a longitudinal sectional view of the trailer frame with my cooling system mounted thereon.

Figure 4 is a horizontal sectional view of the coupling block.

Referring more particularly to the drawing, the numeral 1 indicates a vehicle which is powered by the usual engine 2. A trailer 3 is towed by the vehicle 1 and the trailer includes the usual frame 4. The engine 2 is provided with the usual radiator 5, as is usual and well known, however, the capacity of the radiator 5 is too small to accommodate the additional load of the trailer 3.

To provide additional water capacity and also additional cooling area for the water, I provide conduits 6—7 which extend from the engine 2 rearwardly to the vehicle 1 to a coupling block 8. The coupling block may be of any desired type which consists of a means of supporting the water lines so that the trailer 3 can be uncoupled from the vehicle 1, when desired. The conduits 6—7 extend into the separable coupling block 8 and a second pair of water conduits 9—10 also extend into the separable coupling block 8 rearwardly along the frame 4 of the trailer to a second radiator 11. The radiator is preferably mounted adjacent the rear of the frame 4 and extends from side to side of this frame, substantially as shown. A vertical baffle 12 extends upwardly from the radiator 11 to the upper edge of the frame 4 and compelling the flow of air downwardly through the radiator as shown by the arrows in Figure 3. Since the radiator 11 extends to both sides of the frame 4, the sides are also thus closed or, if desired, a wall or closure can be provided at the sides of the radiator. To prevent loss of water at the coupling block 8, I may provide a valve 13 for each of the conduits 6—7 and a similar valve 14 is mounted on either or both of the conduits 9—10 to close these conduits when the block 8 is separated.

In operation, when the trailer 13 is attached to the vehicle 1, the water conduits 6—7 are attached to the conduits 9—10, respectively, the valves 13—14 are then opened and the water pump of the engine 2 will circulate water not only through the radiator 5, but also through the auxiliary radiator 11, thus maintaining the engine 2 at a proper operating temperature.

If desired, an air scoop 15 may be provided at the front edge of the radiator 11 for the purpose of deflecting air upwardly and into the upper face of the radiator so that the air will flow in the direction shown by the arrows in Figure 3.

Having described my invention, I claim:

1. A trailer mounted engine cooling system comprising in combination with a trailer, a radiator mounted on said trailer, conduits extending into said radiator and a separable coupling block, said conduits extending into the block and conduits extending from said block to the engine of the pulling vehicle.

2. A trailer mounted engine cooling system comprising in combination with a trailer and the frame of said trailer, a radiator mounted on said frame, a baffle projecting from the radiator and extending between the frame whereby air is deflected through the radiator, and conduits extending into said radiator.

3. A trailer mounted engine cooling system comprising in combination with a trailer and the frame of said trailer, a radiator mounted on said frame, a baffle projecting from the radiator and extending between the frame whereby air is deflected through the radiator, and conduits extending into said radiator and a separable coupling block, said conduits extending into said block.

4. A trailer mounted engine cooling system comprising in combination with a trailer and the frame of said trailer, a radiator mounted on said frame, a baffle projecting from the radiator and extending between the frame whereby air is deflected through the radiator, and conduits extending into said radiator and a separable coupling block, said conduits extending into said block, and conduits extending from said block to the engine of the pulling vehicle.

HARRY C. PROUSE.

REFERENCES CITED

The following references are of record in the file of this patent:

UNITED STATES PATENTS

| Number | Name | Date |
| --- | --- | --- |
| 1,820,752 | Masury | Aug. 25, 1931 |
| 2,118,884 | Fuchs | May 31, 1938 |